Aug. 12, 1941.   W. L. L. VIVIE   2,252,103
ADJUSTABLE GANG CONDENSER
Filed June 22, 1939

INVENTOR
WILHELMUS LAMBERTUS LEONARDUS VIVIE
BY
ATTORNEY

Patented Aug. 12, 1941

2,252,103

UNITED STATES PATENT OFFICE 2,252,103

ADJUSTABLE GANG CONDENSER

Wilhelmus Lambertus Leonardus Vivie, Eindhoven, Netherlands, assignor, by mesne assignments, to Radio Corporation of America, New York, N. Y., a corporation of Delaware Application June 22, 1939, Serial No. 280,515
In Germany July 25, 1938

2 Claims. (Cl. 175—41.5)

This invention relates to an adjustable gang condenser system, particularly a ganged sliding-electrode condenser, of which use may be made, for example, in a wireless set with single-knob tuning.

It has been found that the equalization of a ganged-condenser system, all the stationary or all the movable electrodes of which are supported by at least two carriers extending substantially parallel with the condenser shaft and fixed or journalled in a rigid structural part, for example in a casing wall, is disturbed in some cases due to the fact that the capacities of the individual condensers of the ganged-condenser system are subject to variations of different value. The latter fact is particularly harmful in that the various oscillatory circuits of which the condensers form part are detuned with respect to each other so that equalization of the oscillatory circuits is impaired.

The present invention has for its object to reduce or neutralize the mutual detuning occurring in the above-mentioned construction of ganged-condenser systems. The invention is based on recognition of the fact that the detunings are due to temperature fluctuations.

According to the invention, the rigid structural parts in which the two carriers are fixed or journalled and the electrode parts supported upon the carriers are made of materials having the same or substantially the same coefficients of expansion.

In a ganged sliding-electrode condenser system whose helical electrodes are provided with a bottom plate and in which the bottom plates of the stationary electrodes are secured to at least two carriers arranged so as to be symmetrically with respect to the condenser shaft and preferably made of ceramic material, said carriers being fixed at least at one end in a casing wall which is substantially normal to the condenser shaft, the bottom plates of the stationary electrodes and the said casing wall or walls are made of materials having the same coefficients of expansion, preferably of the same metal.

Figure 1:
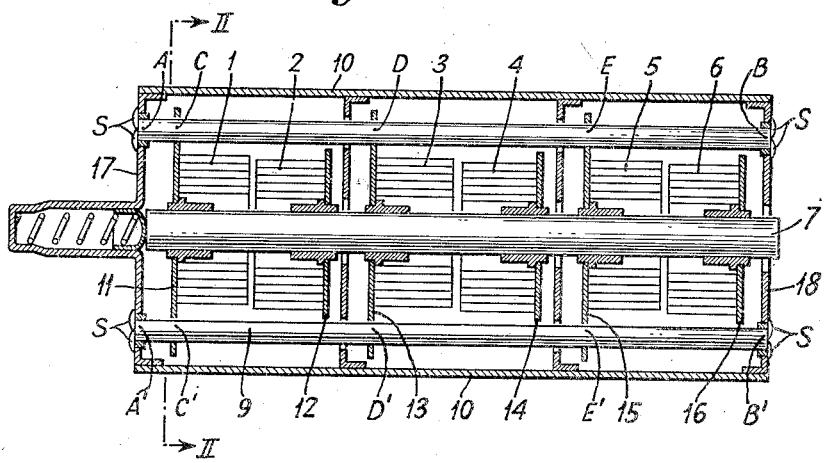

In order that the invention may be clearly understood and readily carried into effect it will now be described more fully with reference to the accompanying drawing, in which Fig. 1 is a longitudinal section of a ganged sliding-electrode condenser.

Figure 2:
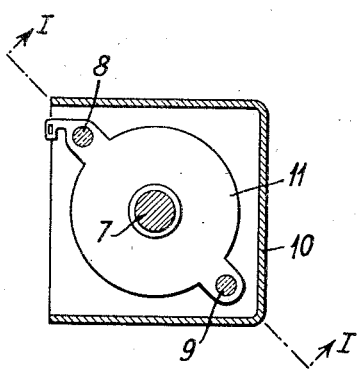

Fig. 2 is a cross-sectional view of the said condenser, identical parts being designated in both figures by like reference numerals.

In the embodiments illustrated, each of the condenser electrodes, 1, 2 . . . 6 is constituted by a helical armature secured respectively to a bottom plate 11, 12 . . . 16. The slidable electrodes 2, 4 and 6 are secured to a slidable shaft 7 journalled in centering sleeves soldered to the bottom plates 11, 13 and 15 of the stationary electrodes 1, 3 and 5. The driving means for the slidable shaft 7 is not shown on the figures since it is no feature of the present invention. The bottom plates 11, 13 and 15 of the stationary electrodes 1, 3 and 5 are rigidly connected to the carriers 8 and 9 which are arranged so as to be symmetrical with respect to the condenser shaft and are made of ceramic material poor in loss. The carriers 8 and 9 are soldered at their ends to the walls 17 and 18 respectively which form part of the casing 10 and are arranged normally to the condenser shaft.

If, as has hitherto been the standard practice, the bottom plates of the electrodes are made of copper or brass and the casing including the casing walls 17 and 18 is made of sheet iron, the mutual equalization of the condensers will only be correct, if the room temperature of the condenser is in exact agreement with the temperature at which the condenser was equalized after its manufacture. For other temperatures there is mutual detuning of the capacity of the individual condensers. The reason for the above-mentioned detuning is found in the following.

As is seen from Fig. 1, the carriers 8 and 9 are interconnected at a plurality of points, that is to say by the two casing walls 17 and 18 at the points A, A' and B, B' and by the bottom plates 11, 13 and 15 of the stationary electrodes 1, 3 and 5 at the points C, C', D, D' and E, E'. It may now be assumed that the condenser was equalized after manufacture at a room temperature of e. g. 20° C. and that at this temperature the carriers are exactly parallel throughout their length. If the room temperature increases to 30° C. (a temperature which frequently occurs in a wireless set when in use) and if the coefficient of expansion of the bottom plates 11, 13 and 15 is twice the coefficient of expansion of the casing walls 17 and 18 then the increase of the spacings C—C', D—D', E—E' will be twice the increase of the spacings A—A' and B—B'. Thus, whereas the carriers were originally parallel, the spacing of the central parts of the carriers is now larger than that of the carrier ends, or in other words the carriers are warped. Obviously, the change in form produced is, however, by no means limited to the carriers for, since the bottom plates are hampered in their free expansion by the carriers, the bottom plates have also exerted on them forces bringing about a change in form of the bottom plates and the armatures. The mutual detuning of the condensers is due to the fact that the various bottom plates 11, 13 and 15 are subject to distortional forces of different strength. As may be derived from Fig. 1, the bottom plate 11 is very close to the ends, secured to the casing wall 17, of the carriers 8 and 9 and this bottom plate is consequently submitted to distortional forces in a greater degree than the other bottom plates. Apart from the above, it is clearly evident that the bottom plates 11 and 15 are not distorted in the same manner. In the construction illustrated, it has been found from actual experience that the centre of the bottom plate 11 is displaced to the right as a result of distortion and will, for example, bring about an increase in capacity, whereas the centre of the bottom plate 15 is subjected to a displacement to the left with the result of a decrease in capacity of the condenser concerned.

The mutual detuning of the condensers is therefore due to the different coefficients of expansion of the bottom plates 11, 13 and 15, of the stationary electrodes 1, 3 and 5 and of the casing walls 17 and 18.

If in particular the air-gap between the oppositely arranged armatures is smaller than 0.5 mm., for example 0.2 mm., and the thickness of the armatures is small, for example 0.1 mm., the distortion brings about inadmissibly great detunings even for difference in temperatures of 5° C.

According to the invention, the said defects are obviated due to the fact that the bottom plates of the stationary electrodes 11, 13 and 15 and the casing walls 17 and 18 to which the carriers 8 and 9 are secured, are made of materials having identical coefficients of expansion, for example of the same metal. This avoids the occurrence of the distortion described since all the parts extending between the carriers are subject to the same expansion so that the reason for the production of distortional forces is removed.

The use of the invention is also advantageous when the carriers are secured to a casing wall or another structural part at only one end.

I claim:

1. In a gang condenser of the slidable electrode type, a housing having a pair of end plates, a pair of cross rods extending between said end plates and rigidly affixed thereto, a slidable control shaft disposed in parallel relation to the cross rods and having affixed thereto in spaced relation a plurality of movable condenser electrodes, a plurality of stationary condenser electrodes, each cooperating with one of the movable electrodes and having a base plate rigidly attached to said cross rods, the spacing between the base plate of one end electrode and the housing plate at that end being closer than the spacing between the base plate of the opposite end electrode and the housing plate at that end, by reason of which on account of temperature changes the several base plates are subjected to unequal warping causing misalignment of the electrodes carried thereby with respect to their cooperating movable electrodes, said base plates of the stationary electrodes and the housing end plates being of material having substantially the same coefficient of expansion whereby capacity variations between the several units of the gang condenser due to temperature changes are avoided.

2. In a gang condenser of the slidable electrode type, a housing having a pair of metallic end plates, a pair of cross rods of ceramic material extending between said end plates and rigidly affixed thereto, a slidable control shaft of ceramic material disposed in parallel relation to the cross rods and having affixed thereto in spaced relation a plurality of movable condenser electrodes, a plurality of stationary condenser electrodes each cooperating with one of the movable electrodes and having a metallic base plate rigidly attached to said supporting rods, the spacing between the base plate of one end electrode and the housing plate at that end being closer than the spacing between the base plate of the opposite end electrode and the housing plate at that end, by reason of which on account of temperature changes the several base plates are subjected to unequal warping causing misalignment of the electrodes carried thereby with respect to their cooperating movable electrodes, said base plates of the stationary electrodes and the housing end plates being disposed in parallel relation and made of material having substantially the same coefficient of expansion whereby irrespective of temperature changes the cross bars and control shaft are maintained in parallelism thus preventing the stationary electrodes from being deformed and giving rise to capacity variations between the several units of the gang condenser.

WILHELMUS LAMBERTUS
LEONARDUS VIVIE.